Patented June 24, 1924.

1,499,002

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

PROCESS OF PRODUCING HEXAMETHYLENETETRAMINE.

No Drawing.    Application filed January 10, 1924.    Serial No. 685,456.

*To all whom it may concern:*

Be it known that I, CARNIE B. CARTER, a citizen of the United States, residing at Pittsburgh, in the county of Allegheny and State of Pennsylvania, have invented a new and useful Improvement in Processes of Producing Hexamethylenetetramine, of which the following is a specification.

The present invention relates to the productions of hexamethylenetetramine; and the primary object is to provide an improved method which will enable hexamethylenetetramine to be produced within a practicable working period without employing objectionably high pressure.

Methylene chloride may be readily obtained as one of the chlorinated products of natural gas, for example, The present method provides for the production from methylene chloride, at comparatively low cost, of hexamethylenetetramine which is widely used in the arts.

Methylene chloride enters into reaction with liquid ammonia to form hexamethylenetetramine at temperatures as low as 20 to 25° C., but the time required for the reaction is too great to render it practicable to operate at such temperature. The reaction may be represented by the following equation:

$$6CH_2Cl_2 + 16NH_3 = (CH_2)_6N_4 + 12NH_4Cl.$$

Ammonia is a gas under normal conditions of temperature and pressure, and condenses to a liquid under atmospheric pressure at a temperature of about $-35°$ C. Under heavier pressures, ammonia may be kept in liquid form at higher temperatures.

According to the present preferred process, methylene chloride is employed as a liquid and caused to react with ammonia in liquid condition, the ammonia being employed in very large excess. It has been found that by employing the ammonia in excess to an extent of more than 100% above the theoretical proportions, the reaction may be greatly expedited at a given temperature and corresponding pressure. The law holds good when the reaction is carried out at room temperature, and it holds good when the reaction is carried out at higher temperatures, say any temperature between 50° and 125° C.

The effect of increasing the proportion of ammonia is illustrated by the following table of results obtained at room temperature, the experiments being conducted with sealed glass test tubes, each of which contained the same weight of methylene chloride, but the amounts of liquid ammonia varying in the several test tubes as shown in the table. The tubes were allowed to stand at laboratory temperatures for 378 hours. Results were as follows:

| Tube. | Proportion of ammonia. | State of the reaction. |
|---|---|---|
|  |  | *Per cent complete.* |
| 1 | Theoretical weight ammonia | 15.0 |
| 2 | 100% excess ammonia | 30.3 |
| 3 | 200% excess ammonia | 42.6 |
| 4 | 300% excess ammonia | 46.5 |

It appears from the foregoing that where 300% excess ammonia is employed the reaction velocity is more than three times the velocity where the theoretical percentage is employed. It may be stated, also, that after the tubes had stood for a few days, the liquid in tube 1 formed a double layer and began to deposit crystals. This is a characteristic phenomenon where the ammonia is not employed in very large excess. The phenomenon was noted even in connection with tube 2, but did not appear at all in connection with tubes 3 and 4.

As showing the increase in velocity of reaction by employing 300% excess ammonia as compared with 100% excess ammonia, it may be stated that operating at 60° C. and employing excess ammonia to the extent of 100%, the time for completion of the reaction was found to be about 114 hours, whereas, employing 300% excess ammonia, the time required for completing the reaction was found to be in the neighborhood of 50 hours, in some cases considerably less.

While it is quite possible to carry on the reaction at any temperature up to about 125° C. (the critical temperature of ammonia being 130° C.), it may be stated that very heavy pressures are developed at temperatures in the neighborhood of 100° C. or higher, and it is much more practicable to provide a process which can be carried out at lower pressures. For example, the working pressure incident to a temperature of 100° C. is approximately 900 pounds per square inch, while at a temperature of 60° C., the pressure incident thereto is about 380 pounds per square inch (absolute). Thus, by employing a larger excess of ammonia, say well above 100% in excess of the theoretical amount, it is possible to carry on the reaction with requisite speed at a temperature in the neighborhood of 50 or 60° C., with correspondingly reduced pressures. This renders it possible to use autoclaves and other apparatus of lighter construction and much larger capacities in practicing the process.

In practice, the manufacture of hexamethylenetetramine by the present method may be carried out in the following way:

A given quantity of methylene chloride is placed in a strong metal autoclave; liquid ammonia is then pumped into the autoclave preferably in large excess of the theoretical amount necessary to combine with all of the methylene chloride to form hexamethylenetetramine and ammonium chloride. The theoretical proportions are six mols of methylene chloride to sixteen mols of ammonia, but it is preferred to use the ammonia in excess to the extent of about 300% above the theoretical proportion. The autoclave is heated to a temperature corresponding with the working pressure which it is desired to employ. A very satisfactory temperature to employ is about 60° C., with a resultant pressure in the neighborhood of 380 pounds to the square inch. By employing such temperature, the reaction may be completed within a reasonable period, and the process may be carried on in a reasonably safe manner without using excessively heavy apparatus.

After the reaction has been completed, the excess ammonia is distilled off and recovered. The residual crystal mass, which is composed of hexamethylenetetramine and ammonium chloride, is treated with chloroform, carbon tetrachloride or other suitable solvent, in any suitable extractor, to separate the hexamethylenetetramine from the ammonium chloride. The hexamethylenetetramine is dissolved by the chloroform or other solvent, the solution being passed to a still by means of which the chloroform is driven off and the hexamethylenetetramine is recovered. The chloroform in the still passes back to the chloroform storage tank, and from the storage tank again to the extractor, being thus used over and over in the process.

The hexamethylenetetramine recovered is of high purity, if pure ammonia and pure methylene chloride are employed in the process, the hexamethylenetetramine requiring no purification.

The ammonium chloride is treated with hydrated lime and subjected to distillation in order to recover the ammonia. The recovered ammonia is subsequently used in the formation of more hexamethylenetetramine.

The ammonia preferably is employed in liquid condition, and it is believed that the liquid ammonia serves as a solvent for the methylene chloride. It is preferred to carry on the process in the absence of water and in the absence of any other liquid intended as a solvent for the methylene chloride. For example, the use of alcohol, whether pure of containing some water, is unnecessary and objectionable. Indeed, the use of alcohol seems, for some reason, to very materially lessen the yield of hexamethylenetetramine.

In practice, the materials, after completion of the reaction, are expelled from the autoclave, and ammonia which has been driven off is withdrawn from the storage tank, compressed to form liquid ammonia, and returned to the liquid ammonia tank to be reused. Also, the ammonia recovered by treating ammonium chloride with hydrated lime is returned to the liquid ammonia storage tank to be reused.

It may be added that the reaction velocity may be increased still further by employing more than 300% excess ammonia. The increase in velocity of reaction above this point is, however, small, and there is little to be gained by increasing the excess above 300%. An excess of 200% ammonia apparently increases the reaction velocity to a point where it is about 2.8 times as fast as the reaction where the ammonia is employed in about theoretical proportion. It is entirely practicable to carry on the process employing in the neighborhood of 200% excess ammonia, and the reaction may still be kept within a period in the neighborhood of 50 hours by employing a temperature somewhat in excess of 60° C. Furthermore, there is economy in operating the process with an excess of ammonia which is greater than 100%, selecting a temperature of operation which corresponds with a reasonably safe working pressure and extending the time for keeping the reaction as may be necessary, depending upon the strength of apparatus which may be selected for use.

In practice, the ammonia is employed under a pressure corresponding with several atmospheres, and preferably the ammonia is employed as a liquid. Moreover, for the purpose of expediting the reaction, even where an excess of ammonia as great as 200% is employed, the temperature, for the purpose of shortening the time of reaction to a reasonable period, should be high enough to produce a pressure in excess of 200 pounds per square inch.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is:

1. The process of producing hexamethylenetetramine which comprises: reacting upon methylene chloride with ammonia, the ammonia being employed in excess of the theoretical proportion to the extent of more than 100% and the reaction being carried on under a pressure exceeding 200 pounds and at a temperature corresponding with such pressure.

2. The process of producing hexamethylenetetramine which comprises: reacting upon methylene chloride with ammonia under pressure exceeding 200 pounds per square inch and at a temperature corresponding with such pressure, the ammonia being present in excess to an extent greater than 100% of the theoretical proportion, and the two reacting substances mentioned being substantially the only substances present in the reaction mixture.

3. The process of producing hexamethylenetetramine which comprises: reacting upon methylene chloride with liquid ammonia, the liquid ammonia being used in excess to an extent of more than 100% of the theoretical proportion.

4. The process of producing hexamethylenetetramine which comprises: heating a mixture comprising methylene chloride and liquid ammonia, under pressure, the liquid ammonia being present in excess to an extent of more than 100% of the theoretical proportion.

5. The process of producing hexamethylenetetramine which comprises: heating a mixture of methylene chloride and liquid ammonia, under pressure, the liquid ammonia being present to an extent of more than 100% in excess of the theoretical proportion, and separating the hexamethylenetetramine formed from the ammonium chloride formed.

6. The process of producing hexamethylenetetramine which comprises: heating a mixture of methylene chloride and liquid ammonia, under pressure, the reaction being carried on with the substances mentioned as substantially the only substances in the mixture, the liquid ammonia being present in excess to an extent of more than 100% above the theoretical proportion.

7. The process of producing hexamethylenetetramine which comprises: heating a mixture comprising methylene chloride and liquid ammonia, under pressure, the ammonia being present in excess to an extent of more than 100% above the theoretical proportion and the reaction being carried out in the absence of water or alcohol.

CARNIE B. CARTER.